(12) United States Patent
Hu

(10) Patent No.: US 6,623,839 B2
(45) Date of Patent: Sep. 23, 2003

(54) FOAM RUBBER SHEET WITH EMBOSSES ON BOTH SIDES THEREOF

(76) Inventor: Chien Chung Hu, No.9, Alley 30, Lane4, Shing Hang St., Yung Kang, Tainan Hsien (TW)

(*) Notice: Subject to any disclaimer, the term of this patent is extended or adjusted under 35 U.S.C. 154(b) by 166 days.

(21) Appl. No.: 09/778,637

(22) Filed: Feb. 7, 2001

(65) Prior Publication Data

US 2002/0106488 A1 Aug. 8, 2002

(51) Int. Cl.[7] .................................................. B32B 3/00
(52) U.S. Cl. ........................ 428/172; 428/71; 428/162; 428/158
(58) Field of Search .......................... 428/71, 76, 158, 428/172, 162, 163, 318, 8, 187

(56) References Cited

U.S. PATENT DOCUMENTS 3,563,837 A * 2/1971 Smith et al. .................. 428/71
4,480,715 A * 11/1984 Brooks ........................ 428/162
5,445,863 A * 8/1995 Slagle et al. ................. 428/156

FOREIGN PATENT DOCUMENTS

WO    WO 9934972    7/1999

* cited by examiner

*Primary Examiner*—Donald J. Loney
(74) *Attorney, Agent, or Firm*—Alan D. Kamrath; Rider Bennett, LLP.

(57) ABSTRACT

A foam rubber sheet includes a substrate made from rubber material and two cloth layers respectively bonded to two sides of the substrate. Each cloth layer has an outer surface including a plurality of recessed portions and a plurality of protruded portions. The foam rubber sheet is made from a foam rubber sheet raw material having the substrate and two second cloth layers bonded to both sides of the substrate. A pair of embossing rolls is provided for drawing the foam rubber sheet raw material to pass through the embossing rolls. Each embossing roll includes an outer surface with a pattern, the pattern being configured to form the recessed portions and the protruded portions on each second layer cloth when the foam rubber sheet raw material is passing through the embossing rolls, thereby forming the foam rubber sheet with the cloth layers having the recessed portions and the protruded portions.

5 Claims, 3 Drawing Sheets

FOAM RUBBER SHEET WITH EMBOSSES ON BOTH SIDES THEREOF

BACKGROUND OF THE INVENTION

1. Field of the Invention

The present invention relates to a foam rubber sheet with embosses on both sides thereof.

2. Description of the Related Art

Materials for clothes include cotton, hemp, flax, silk, etc. A neoprene sheet having a sealing effect is used to produce clothes with anti-cold, waterproof, and warm-keeping functions for diving, surfing, fishing, sporting, etc. The neoprene sheet can also be used to produce medically protective instruments such as waistbands, kneepads, etc.

FIG. 4 of the drawings illustrates a conventional foam rubber sheet having a substrate 50 made from foam rubber material and two cloth layers 60 bonded to both sides of the substrate 50, respectively. The substrate 50 is generally made from neoprene to provide required softness and tensile elasticity for producing clothes with anti-cold, waterproof, and warm-keeping functions. However, it was found that the wearer felt uncomfortable after a period of time due to the waterproof and airtight effects of the clothes. In addition, the surfaces of the clothes made from the foam rubber sheet cannot provide a three-dimensional appearance.

FIG. 5 illustrates a conventional foam rubber sheet 7 having a substrate 70 made from foam rubber material and two cloth layers 80 and 81 bonded to both sides of the substrate 70, respectively. An outer surface of one of the cloth layers, e.g., layer 81 is embossed to provide a three-dimensional pattern 82 for aesthetic purposes. However, the outer surface of the other cloth layer 80 that is in contact with the skin of the wearer is still planar. As a result, an uncomfortable feeling of the wearer resulting from impermeability of air still exists. Currently in the art, the foam rubber sheet 7 is punched by a die (not shown) with a specific pattern to form the pattern 82 on a side of the foam rubber sheet 7. Such a process has a limit in the area of the foam rubber sheet 7 to be punched in each punching process by the die. In addition, the foam rubber sheet 7 cannot be processed continuously and rapidly to have the desired emboss on a side thereof.

SUMMARY OF THE INVENTION

It is the primary object of the present invention to provide a foam rubber sheet with embosses on both sides thereof. The foam rubber sheet with embosses on both sides thereof can be produced continuously and quickly.

A foam rubber sheet in accordance with the present invention comprises a substrate made from rubber material and two cloth layers respectively bonded to two sides of the substrate. Each cloth layer has an outer surface comprising a plurality of recessed portions and a plurality of protruded portions.

The foam rubber sheet is made from a foam rubber sheet raw material having the substrate and two second cloth layers bonded to both sides of the substrate. A pair of embossing rolls is provided for drawing the foam rubber sheet raw material to pass through the embossing rolls. Each embossing roll includes an outer surface with a pattern, the pattern being configured to form the recessed portions and the protruded portions on each second layer cloth when the foam rubber sheet raw material is passing through the embossing rolls, thereby forming the foam rubber sheet with the cloth layers having the recessed portions and the protruded portions.

The foam rubber sheet raw material is heat-pressed by the embossing rolls when passing through the embossing rolls. Material of each second cloth layer is squeezed into the substrate when the foam rubber sheet raw material is passing through the embossing rolls, thereby forming the recessed portions on each cloth layer. Material of the substrate is forced to protrude outward and thus squeezes the material of the cloth layer to protrude outward when the material of each second cloth layer is squeezed into the substrate, thereby forming the protruded portions on each cloth layer of the foam rubber sheet.

Other objects, advantages, and novel features of the invention will become more apparent from the following detailed description when taken in conjunction with the accompanying drawings.

BRIEF DESCRIPTION OF THE DRAWINGS

FIG. 2A is an enlarged view of a circle in FIG. 2.

DETAILED DESCRIPTION OF THE PREFERRED EMBODIMENT

Figure 1:
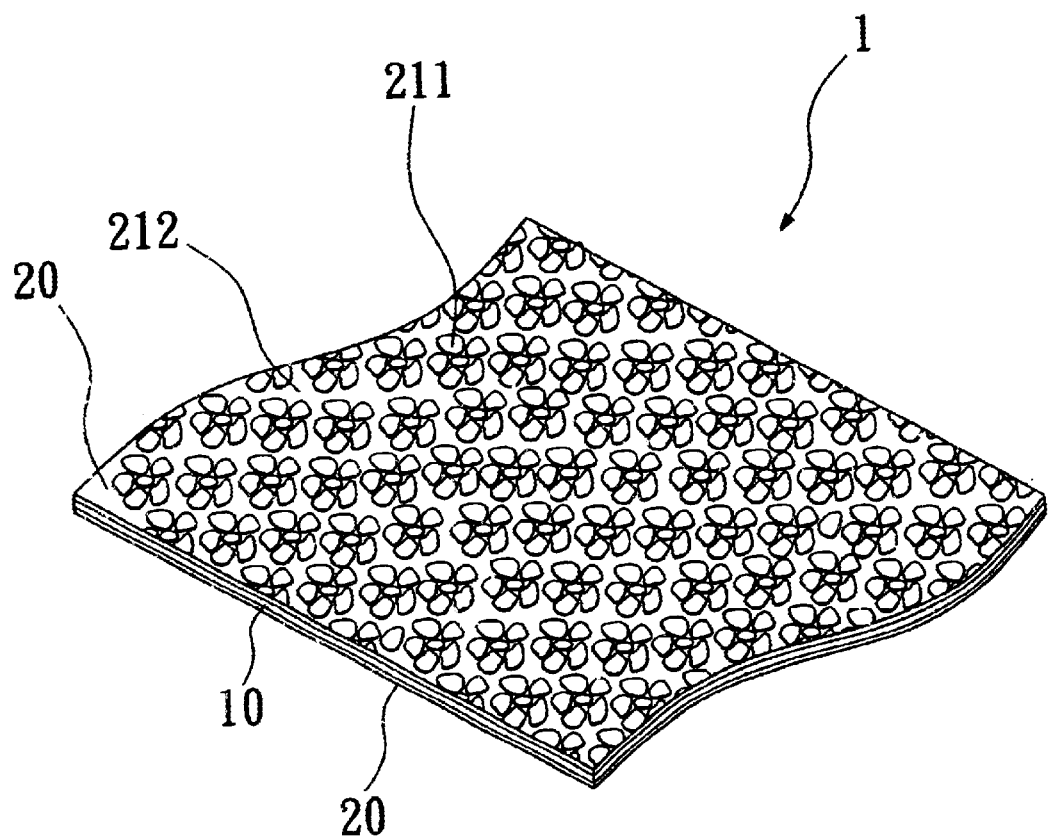
FIG. 1 is a perspective view of a foam rubber sheet in accordance with the present invention.
Figure 2:
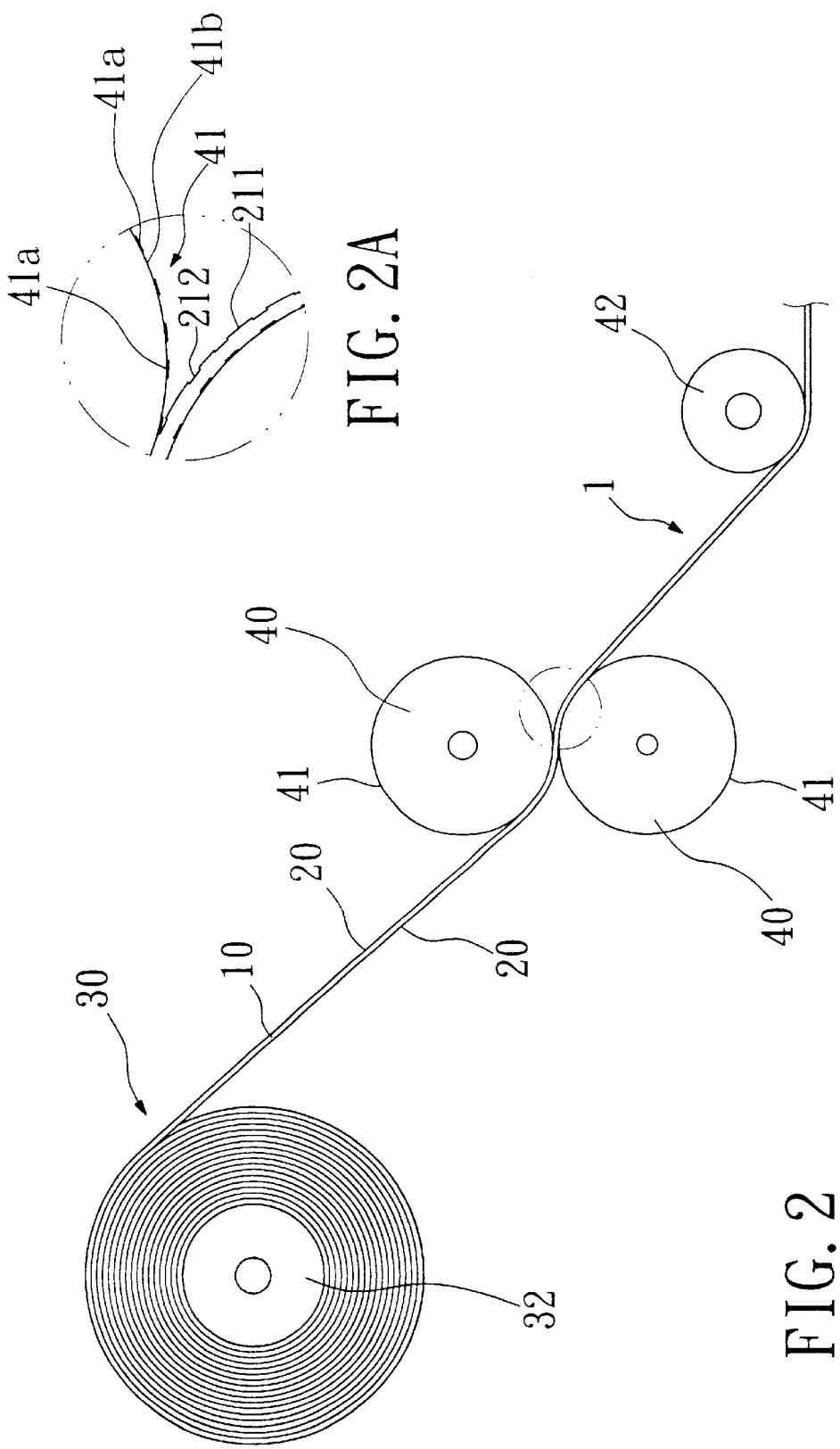
FIG. 2 is a schematic view illustrating formation of embosses on both sides of the foam rubber sheet in accordance with the present invention.
Figure 3:
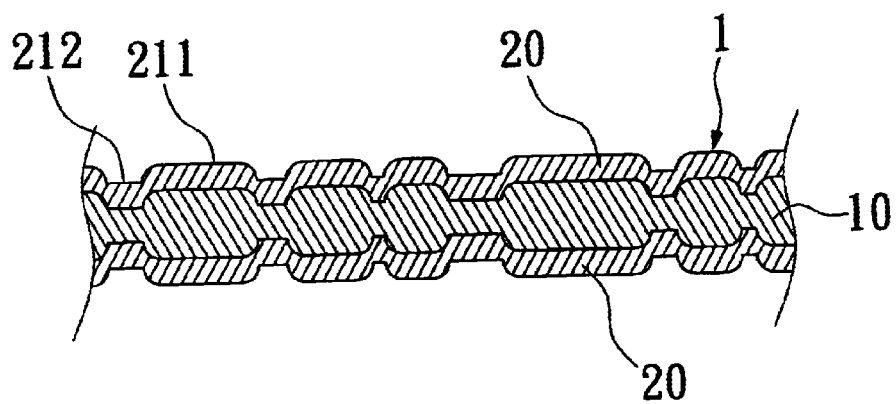
FIG. 3 is a partial sectional view of the foam rubber sheet in accordance with the present invention.
Figure 5:
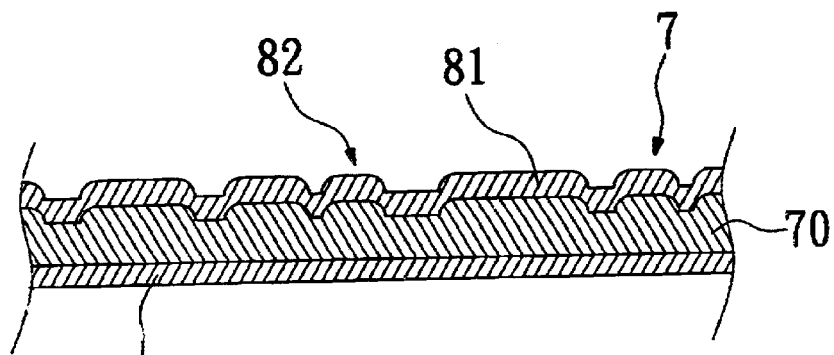
FIG. 5 is a partial sectional view of another conventional foam rubber sheet.
Figure 4:
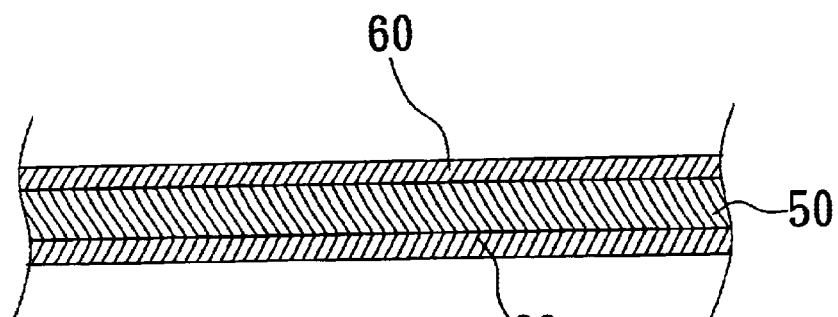
FIG. 4 is a partial sectional view of a conventional foam rubber sheet.

Referring to FIGS. 1 through 3, a foam rubber sheet 1 in accordance with the present invention generally is made from a foam rubber sheet raw material 30 having a substrate 10 and two cloth layers 20 bonded on both sides thereof. The foam rubber sheet raw material 30 wound around a bobbin 32 is drawn by a pair of embossing rolls 40 to pass through the embossing rolls 40. Each embossing roll 40 has an outer surface with a desired pattern 41 thereon.

The cloth layers 20 on the foam rubber sheet raw material 30 is heat-pressed by the embossing rolls 40 when the foam rubber sheet raw material 30 is passing through the pair of embossing rolls 40. Protruded portions 41a (FIG. 2a) on the pattern 41 of each embossing roll 40 squeeze the material of the cloth layer 20 into the substrate 10, thereby generating recessed portions 212 in the substrate 10. In addition, the material of the substrate 10 is forced to enter recessed portions 41b (FIG. 2a) of the pattern 41 on the respective roll 40 and thus squeezes the material of the cloth layer 20 to protrude outward, thereby forming protruded portions 211 on each cloth layer 20. Thus, each cloth layer 20 has a plurality of recessed portions 212 and a plurality of protruded portions 211 on an outer surface thereof after the foam rubber sheet raw material 30 has passed through the pair of embossing rolls 40, as shown in FIGS. 2 and 2A. The foam rubber sheet material 30 becomes a foam rubber sheet 1 with a desired pattern on each of two sides thereof, i.e.; each side of the foam rubber sheet 1 is embossed by a respective roll 40. The foam rubber sheet 1 is then guided by a roller 42 to a package winding fixture (not shown) or the like.

As illustrated in FIG. 3, the foam rubber sheet 1 have recessed portions 212 on each side thereof which may provide spaces for air. Thus, the wearer's skin that is in contact with the foam rubber sheet 1 will not feel uncomfortable even after a long-term wearing. At least some of the recessed portions 212 are communicated with each other. The substrate 10 of the foam rubber sheet 1 is made from rubber material, preferably neoprene, to provide desired softness, sealing effect, and tensile elasticity. The foam rubber sheet 1 can thus be used to produce clothes with anti-cold, waterproof, and warm-keeping functions. Another advantage provided by the patterns on both sides of the foam rubber sheet 1 is, of course, the aesthetically pleasing effect. Clothes made from the foam rubber sheet 1 can be worn with either side facing outward. In addition, the foam rubber sheet 1 can be produced continuously and rapidly.

Although the invention has been explained in relation to its preferred embodiment, it is to be understood that many other possible modifications and variations can be made without departing from the scope of the invention as hereinafter claimed.

What is claimed is:

1. A foam rubber sheet comprising an integral substrate made from neoprene and two cloth layers respectively bonded to two sides of the integral substrate, with the integral substrate including a plurality of recessed portions and protruded portions, with each said cloth layer including an embossed outer surface having a plurality of recessed portions and a plurality of protruded portions that respectively overlie the recessed portions and the protruded portions of the integral substrate, with the cloth layers, including the recessed portions and protruded portions of each said cloth layer, being bonded to the integral substrate throughout an entire length of each said cloth layer, with the integral substrate and the cloth layers being flexible.

2. The foam rubber sheet as claimed in claim 1, wherein the recessed portions and the protruded portions of said integral substrate and of each said cloth layer being formed by passing said integral substrate sandwiched between the two cloth layers between a pair of embossing rolls, each said embossing roll including an outer surface with a pattern, the pattern being configured to form said recessed portions and said protruded portions on each said cloth layer and the integral substrate passing through the embossing rolls.

3. The foam rubber sheet as claimed in claim 2, wherein the integral substrate is heat-pressed by the embossing rolls when passing through the embossing rolls.

4. The foam rubber sheet as claimed in claim 3, wherein material of each said cloth layer is squeezed into the integral substrate when the integral substrate is passing through the embossing rolls, thereby forming the recessed portions on each said cloth layer.

5. The foam rubber sheet as claimed in claim 4, wherein the neoprene of the integral substrate and the material of each cloth layer is formed to protrude outward when the material of each said cloth layer is squeezed into the integral substrate, thereby forming the protruded portions on each said cloth layer and the integral substrate.

\* \* \* \* \*